May 19, 1970 — H. VERDIER — 3,512,566
SNOW TIRE
Filed Dec. 18, 1967 — 2 Sheets-Sheet 1
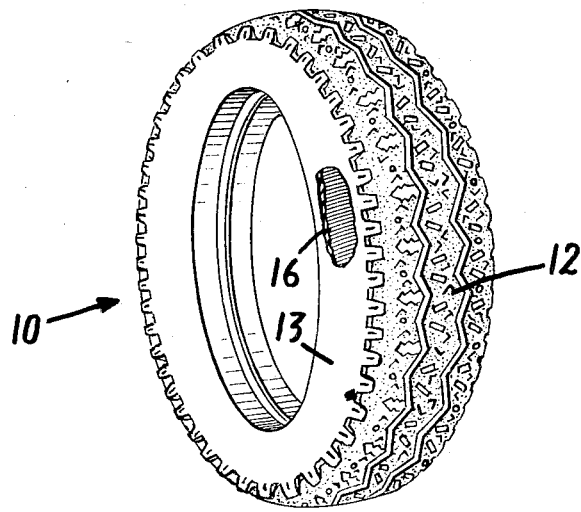
FIG. 1
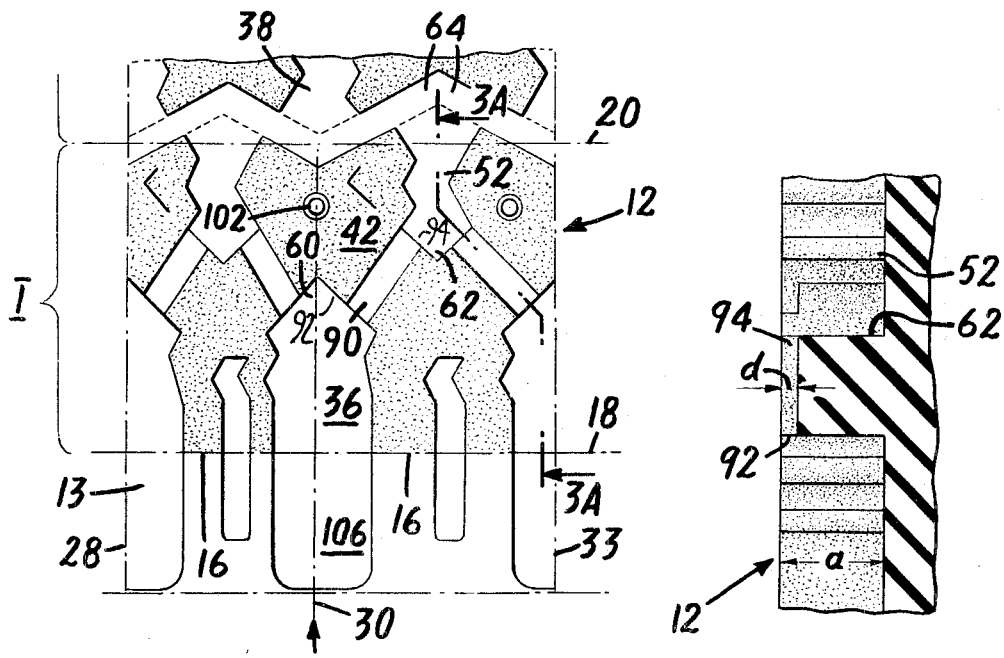
FIG. 3
FIG. 3A
INVENTOR.
HENRI VERDIER May 19, 1970          H. VERDIER          3,512,566

SNOW TIRE

Filed Dec. 18, 1967          2 Sheets-Sheet 2

INVENTOR.
HENRI VERDIER
BY
Brumbaugh, Free, Graves & Donohue his    ATTORNEYS

United States Patent Office 3,512,566
Patented May 19, 1970

3,512,566
SNOW TIRE
Henri Verdier, Beauregard-l'Eveque, France, assignor to Compagnie Generale des Etablissements Michelin, raison sociale Michelin & Cie, Clermont-Ferrand, Puy-de-Dome, France
Filed Dec. 18, 1967, Ser. No. 691,337
Claims priority, application France, Dec. 19, 1966, 88,045
Int. Cl. B60c 11/04
U.S. Cl. 152—209     10 Claims

ABSTRACT OF THE DISCLOSURE

A snow tire is provided with a tread characterized by (a) deep crosswise grooves, all substantially of the same length arranged in alternating rows so as to involve the entire width of the tread; (b) at least two deep lengthwise grooves each forming a broken line and joining the ends of the crosswise grooves and dividing the tread into three zones of substantially equal area; and (c) oblique grooves connecting adjacent ends of the crosswise grooves, the depths of the oblique grooves ranging from zero to the depth of the crosswise grooves and varying from zone to zone. The depth of the oblique grooves is at a maximum in the center zone, equal to or less than the center-zone depths in the inside zone, and at a minimum value or zero in the outside zone.

BACKGROUND OF THE INVENTION

This invention relates to snow tires and, more particularly, to a novel and highly-effective snow tire of the radial carcass type for mounting on motor vehicles and adapted to give superior performance on a variety of different types of surface.

Typically, most of the life of a snow tire is spent on snowless roads. It is therefore important that a snow tire be adapted not only to give satisfactory performance on frozen snow, powdered snow, and melting snow but also on dry, wet, and icy surfaces.

The demands for good performance under these various circumstances are contradictory, and attempts heretofore made to design a snow tire capable of giving the desired performance on a variety of surfaces have not been entirely satisfactory. For example, snow tire treads typically lack adequate lengthwise continuity of the rubber of the tread, and the result is that the tread wears unduly rapidly on dry ground. On the other hand, tires having adequate lengthwise continuity of the rubber of the tread for high-speed sustained driving on dry ground typically have inadequate provision of oblique or crosschannels to permit satisfactory traction on snow and other loose, deformable, and slippery surfaces.

SUMMARY OF THE INVENTION

An object of the present invention is to remedy the deficiencies of conventional tires noted above. In particular, an object of the invention is to provide a snow tire capable of providing superior traction on snow (whether forzen, powdered, or melting) and ice and also capable of operating safely and efficiently on other surfaces including dry paved surfaces for long periods at high speed.

The foregoing and other objects of the invention are attained, in a representative embodiment thereof, by the provision of (a) deep crosswise grooves, all substantially of the same length arranged in alternating rows so as to involve the entire width of the tread; (b) at least two deep lengthwise grooves each forming a broken line joining the ends of the crosswise grooves and dividing the tread into three zones of substantially equal area; and (c) oblique grooves connecting adjacent ends of the crosswise grooves, the depth of the oblique grooves ranging from zero to the depth of the crosswise grooves and varying from zone to zone. The depth of the oblique grooves is at its maximum value in the center zone, equal to or less than the center-zone depth in the inside zone, and at a minimum value or zero in the outside zone. (The outside zone of the tread refers to the zone which is on the outer side of the tire when the tire is mounted on the vehicle; similarly, the inside zone of the tread refers to the zone which is on the inner side of the tire when the tire is mounted on the vehicle. The tires of the invention are not symmetrical about the equatorial plane. The asymmetric tread provides performance superior to that provided by a symmetric tread for reasons pointed out below.)

BRIEF DESCRIPTION OF THE DRAWING

An understanding of additional aspects of the invention may be gained from a consideration of the following detailed description of representative embodiments thereof, in conjunction with the accompanying figures in the drawing, in which:

FIG. 1 is a perspective view, partly broken away, of a tire tread constructed in accordance with the invention (but on a scale too small to show the details of the novel tread) in combination with a tire of the radial-carcass type;

FIG. 3 is a plan view of a modification of a portion of the tire tread of FIG. 2; and FIG. 3A is a sectional view taken generally along the line 3A—3A of FIG. 3 and looking in the direction of the arrows.

DESCRIPTION OF THE PREFERRED EMBODIMENTS

FIG. 1 shows a pneumatic tire 10 constructed in accordance with the invention. The figure shows a tire tread 12 constructed in accordance with the invention mounted on a tire of the radial-carcass type. FIG. 1 is only for the purpose of illustrating the tread in combination with a radial tire and is on a scale too small for accurate illustration of the tread of the invention. A portion of the sidewall 13 of the tire 10 is shown broken away to reveal radial cords 16, which extend from bead to bead. Radial-carcass tires (i.e., tires having radial cords in the carcass) are basically different from tires having bias-laid cords and are generally superior thereto.

Figure 2:
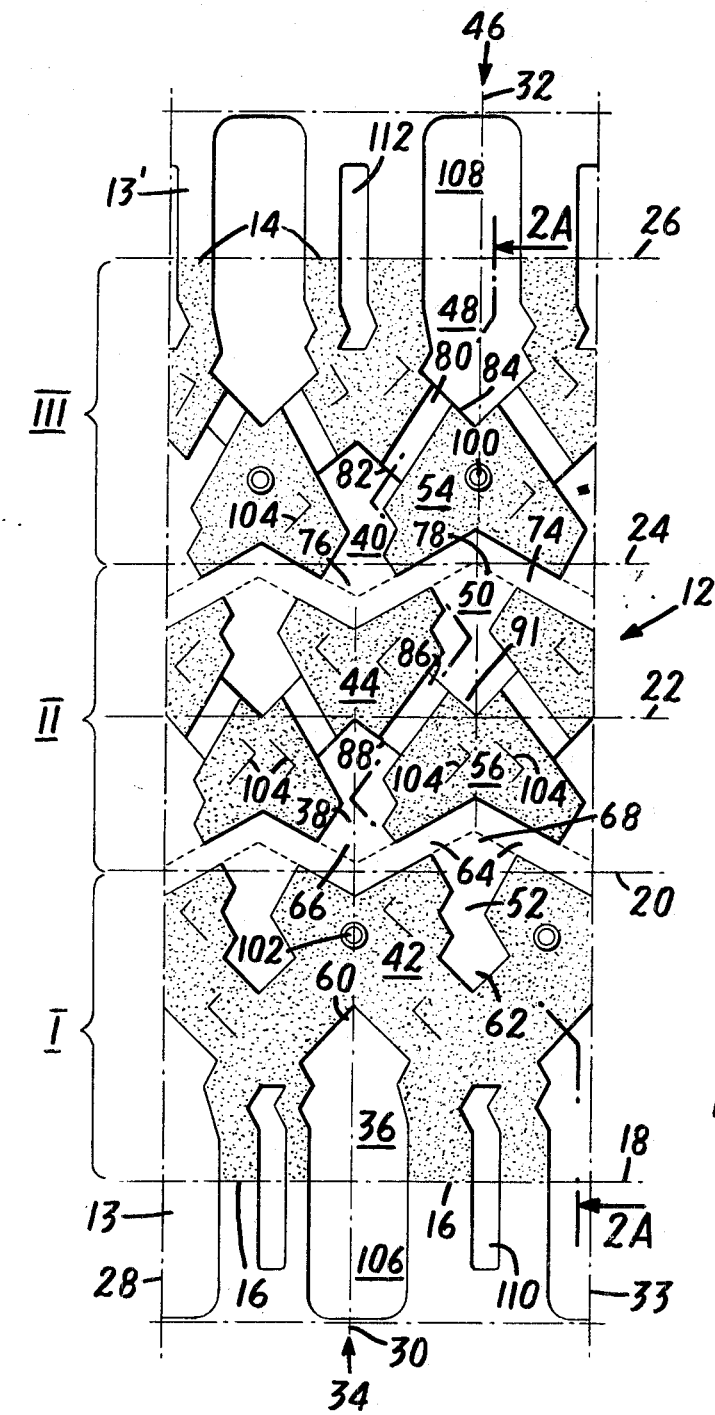
FIG. 2 is a plan view of a representative embodiment of a portion of a tire tread constructed in accordance with the invention.

FIG. 2 shows in detail the structure of the tire tread 12. FIG. 2 is a developed plan view in which the inside edge of the tread (i.e., the edge of the tread intended to be mounted adjacent to the inner side of the vehicle) is represented at 14 and the outside edge of the tread (i.e., the portion of the tread intended to be mounted adjacent to the outer side of the vehicle) is indicated at 16.

The tread 12 is provided with a number of grooves of different classification and function, and, in the description of these grooves, the convention is adopted that the length direction of the tire tread is defined by the intersections with the tire of planes perpendicular to the tire axis and the crosswire direction of the tire tread is defined by the intersection with the tire of planes containing the tire axis. Thus, in FIG. 2, lines 18, 20, 22, 24, and 26 are lengthwise lines (the line 22 representing the median or equatorial lengthwise line), and lines 28, 30, 32, and 33 are crosswise lines. The lengthwise direction of the tread, or the direction in which the tread is adapted to roll, is thus horizontal as seen in FIG. 2, and the crosswise direction of the tread is vertical as seen in FIG. 2.

FIG. 2 shows, at the crosswise line 30, a first crosswise row 34 of crosswise grooves 36, 38, and 40. The row 34 is crosswise in the sense that it extends along the crosswise line 30, and the groves 36, 38, and 40 are crosswise in the same sense. The crosswise grooves 36, 38, and 40 are transversely spaced apart from one another by solid blocks of tread rubber 42 and 44.

FIG. 2 also shows a second crosswise row 46 of crosswise grooves 48, 50, and 52 along the crosswise line 32. The grooves 48, 50, and 52 are crosswise in the sense that they extend generally along the crosswise line 32, and the row 46 is crosswise in the same sense. The longitudinal grooves 48, 50, and 52 are transversely spaced apart from one another by solid blocks of tread rubber 54 and 56.

The first crosswise row 34 and the second crosswise row 46 are at different longitudinal locations lengthwise of the tread 12, and the locations of the crosswise grooves 36, 38 and 40 of the first crosswise row 34 alternate in a transverse direction with the locations of the crosswise grooves 48, 50, and 52 of the second crosswise row 46.

The transverse extremity 60 of the crosswise groove 36 of the crosswise row 34 is at about the same transverse location as the transverse extremity 62 of the crosswise groove 52 of the second crosswise row 46. Similarly, a transverse extremity of each crosswise groove of one of the crosswise rows is at about the same transverse location as a transverse extremity of a crosswise groove of the other of the crosswise rows.

A first lengthwise groove 64 extends from a transverse extremity 66 of the crosswise groove 38 in the first crosswise row 34 to an adjacent transverse extremity 68 of the crosswise groove 52 in the second crosswise row 46. The lengthwise groove 64 is in the form of a broken or zigzag line extending entirely around the circumference of the tire 10.

A second lengthwise groove 74 extends from a transverse extremity 76 of the crosswise groove 40 of the crosswise row 34 to an adjacent transverse extremity 78 of the crosswise groove 50 in the second crosswise row 46.

The first and second lengthwise grooves 64 and 74, respectively, are transversely spaced apart from each other and divide the tread into first, second, and third lengthwise zones, identified as I, II, and III, respectively, of substantially equal area. The second zone II is between the first or outside zone I and the third or inside zone III.

An oblique groove 80 connects a transverse extremity 82 of the crosswise groove 40 of the crosswise row 34 to an adjacent transverse extremity 84 of the crosswise groove 48 of the second crosswise row 46. An oblique groove 86 similarly connects the transverse extremity 88 of the crosswise groove 38 of the crosswise row 34 to an adjacent transverse extremity 91 of the crosswise groove 50 of the second crosswise row 46.

Figure 2A:
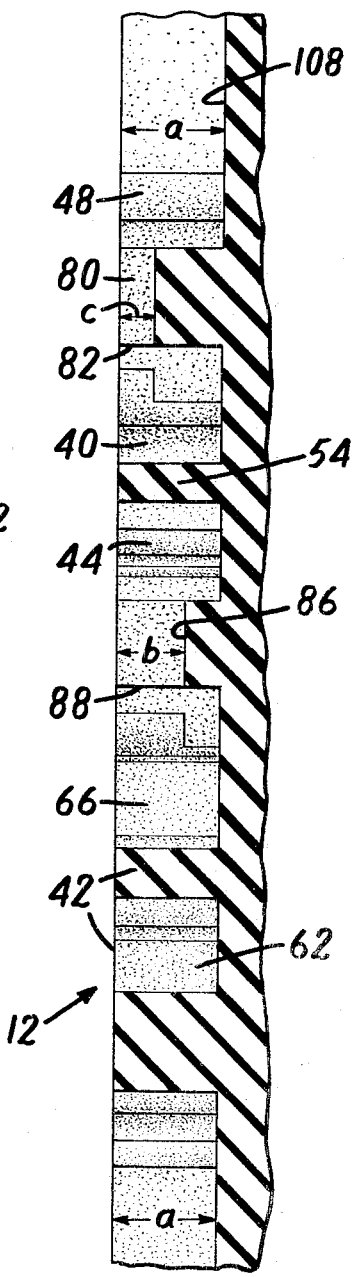
FIG. 2A is a view taken along the line 2A—2A of FIG. 2 and looking in the direction of the arrows.

Each of the crosswise grooves has a depth $a$, as FIG. 2A best shows. Each of the oblique grooves has a depth $b$ in the second zone and a depth $c$ in the third zone, as FIG. 2A also illustrates. The value of $b$ under no circumstances exceeds the value of $a$ and is either equal to or less than the value of $a$. In FIG. 2A, the value of $b$ equals two-thirds the value of $a$.

The value of $c$ is equal to or less than the value of $b$ and under no circumstances greater than the value of $b$. In the embodiment of FIG. 2A, the value of $c$ is one-third the value of $a$ or half the value of $b$.

In the embodiment of FIGS. 3 and 3A, additional oblique grooves such as an oblique groove 90 are formed in the first or outer zone of the tread. The oblique groove 90 connects an extremity 92 of the crosswise groove 36 of the crosswise row 34 to an adjacent extremity 94 of the crosswise groove 52 of the second crosswise row 46.

As FIG. 3A shows, the depth $d$ of the oblique groove 90 and the other oblique grooves in the first zone is less than the depth $c$ of the oblique grooves in the third zone. In the embodiment illustrated in FIGS. 3 and 3A, the depth $d$ of the oblique grooves in the first zone is one-sixth the depth $a$ of the crosswise grooves or half the depth $c$ of the oblique grooves in the third zone.

Thus, taking the depth $a$ of the crosswise grooves as a reference, the depth $b$ of the oblique grooves in the middle or second zone is within a range the maximum value of which is limited by the value $a$. Similarly, the depth $c$ of the oblique grooves in the third or inside zone is within a range the maximum value of which is limited by the value selected for $b$. The depth $d$ of the oblique grooves in the outer or first zone is less than the depth $c$ (FIGS. 3 and 3A) and is preferably 0 (FIGS. 2 and 2A). This is represented as succinctly as possible by the expression $$a \geqslant b \geqslant c > d \geqslant 0$$

Each of the crosswise grooves 36, 38, 40, 48, 50, and 52 has substantially the same length. The oblique grooves 86 and 90 are narrower and shorter than the crosswise grooves.

The lengthwise grooves 64 and 74 may have the same depth $a$ as the crosswise grooves.

A metal stud 100 is embedded in the tread in the third zone between adjacent crosswise grooves 48 and 50 of the second crosswise row 46, and a metal stud 102 is embedded in the tread in the first zone between adjacent crosswise grooves 36 and 38 of the first crosswise row 34.

The lengthwise grooves 64 and 74 are substantially continuous around the circumference of the tire 10, as FIG. 1 illustrates.

A multiplicity of L-shaped narrow grooves 104 is formed in the tread in spaced-apart relation to the crosswise, lengthwise and oblique grooves described above.

Crosswise groves 106 and 108 are provided in the sidewalls 13 and 13'. These grooves are contiguous with and form a continuation of the crosswise grooves 36 and 48, respectively. Additional crosswise grooves 110 and 112, affecting mainly the sidewalls, are also provided.

The structure described above is of course repeated around the circumference of the tire. Thus, as the tire rolls along a wet surface, the crosswise grooves assure draining by communication with the lengthwise grooves and by communication with the sidewalls of the tire. The crosswise grooves also improve tire traction, especially on snow. The entire width of the tread, or practically the entire width thereof, is affected by the crosswise grooves, thus giving the tire maximum traction under adverse road conditions.

The oblique grooves are tailored to the stresses encountered by the tread in each of the three zones in such a way as to equalize wear. The oblique grooves have their maximum depth in the second or center zone and have maximum effect there in combination with the crosswise grooves.

The oblique grooves have their minimum depth or are eliminated in the outside zone. This is the zone which is subjected to the greatest stress, particularly in cornering, and here in particular it is advisable to provide continuity of the rubber tread in the lengthwise or rolling direction so as to improve the performance of the tire on dry ground.

The oblique grooves have an intermediate depth in the third or inside zone, inasmuch as this zone is subjected to fewer stresses than the outside zone but more stresses than the center zone.

Thus there is provided in accordance with the invention a novel and highly-effective snow tire providing both the continuity of lengthwise groves needed for good draining or evacuation and the discontinuity of crosswise grooves affecting the entire width of the tread, thereby forming an imbrication of the grooves combined with an intercommunication or linking of the reliefs in each of the three zones.

Many modifications of the representative embodiments described above will occur to those skilled in the art. For example, it is possible to employ crosswise grooves of different lengths in the different zones. Many other modifications within the spirit and scope of the invention will occur to those skilled in the art. Accordingly, the invention is to be construed as including all of the modifications thereof within the scope of the appended claims.

I claim:
1. In a snow tire, a tread comprising
a first crosswise row of crosswise grooves, said first crosswise row extending generally crosswise of said tread and including grooves (a) extending generally crosswise of said tread and (b) transversely spaced apart from the other crosswise grooves of said first crosswise row,
a second crosswise row of crosswise grooves, said second crosswise row extending generally crosswise of said tread and including grooves (a) extending generally crosswise of said tread and (b) transversely spaced apart from the other crosswise grooves of said second crosswise row,
said first and second crosswise rows being at different locations lengthwise of said tread, the locations of the crosswise grooves of said first crosswise row alternating in a transverse direction with the locations of the crosswise grooves of said second crosswise row, a transverse extremity of each crosswise groove of one of said crosswise rows being at about the same transverse location as a transverse extremity of a crosswise groove of the other of said crosswise rows,
a first lengthwise groove extending from a transverse extremity of a crosswise groove in one of said crosswise rows to an adjacent transverse extremity of a crosswise groove in the other of said crosswise rows,
a second lengthwise groove extending from a transverse extremity of a crosswise groove of one of said crosswise rows to an adjacent transverse extremity of a crosswise groove in the other of said crosswise rows,
said first and second lengthwise grooves being transversely spaced apart from each other and dividing said tread into first, second, and third lengthwise zones of substantially equal area, said second zone being between said first and third zones, and
a plurality of oblique grooves each connecting a transverse extremity of a crosswise groove of one of said crosswise rows to an adjacent transverse extremity of a crosswise groove of the other of said crosswise rows,
each of said crosswise grooves having a depth $a$ and each of said oblique grooves having a depth $b$ in said second zone, a depth $c$ in said third zone, and a depth $d$ in said first zone, where

$$a \geq b \geq c > d \geq 0$$

2. A snow tire as set forth in claim 1 in which each of said crosswise grooves has substantially the same length.
3. A snow tire as set forth in claim 1 in which said lengthwise grooves have a depth $a$.
4. A snow tire as set forth in claim 1 further comprising a metal stud embedded in said tread in said third zone between adjacent ones of said crosswise grooves of said second crosswise row and a metal stud embedded in said tread in said first zone between adjacent ones of said crosswise grooves of said first crosswise row.
5. A snow tire as set forth in claim 1 in which the tire carcass includes radial cords.
6. A snow tire as set forth in claim 1 in which said lengthwise grooves are substantially continuous around the circumference of the tire.
7. A snow tire as set forth in claim 1 in which each of said lengthwise grooves is in the form of a broken line.
8. A snow tire as set forth in claim 1 further comprising L-shaped narrow grooves in said tread in spaced-apart relation to said crosswise, lengthwise, and oblique grooves.
9. A snow tire as set forth in claim 1 in which said first zone is free of oblique grooves.
10. A snow tire as set forth in claim 1 further comprising crosswise grooves in the sidewalls of the tire, each such groove being contiguous with and forming a continuation of a crosswise groove in said first and second rows.

References Cited
UNITED STATES PATENTS

| | | | |
|---|---|---|---|
| 3,162,229 | 12/1964 | Ellenrieder | 152—209 |
| 3,409,064 | 11/1968 | Leonard | 152—209 |

ARTHUR L. LA POINT, Primary Examiner

C. B. LYON, Assistant Examiner